United States Patent
Dhawan et al.

(10) Patent No.: US 12,099,435 B2
(45) Date of Patent: Sep. 24, 2024

(54) SELF-CORRECTING BOT

(71) Applicant: Bank of America Corporation, Charlotte, NC (US)

(72) Inventors: Lalit Dhawan, Cranbury, NJ (US); Swetha Ravi, Charlotte, NC (US); Kevin A. Delson, Woodland Hills, CA (US); Pratap Dande, Saint Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 18/093,874

(22) Filed: Jan. 6, 2023

(65) Prior Publication Data

US 2024/0232047 A1      Jul. 11, 2024

(51) Int. Cl.
*G06F 11/36*      (2006.01)
*G06N 20/00*      (2019.01)

(52) U.S. Cl.
CPC ...... *G06F 11/3612* (2013.01); *G06F 11/3664* (2013.01); *G06N 20/00* (2019.01)

(58) Field of Classification Search
CPC ............................. G06F 11/3612; G06N 20/00
See application file for complete search history.

(56) References Cited

U.S. PATENT DOCUMENTS

| | | | |
|---|---|---|---|
| 2020/0065223 A1* | 2/2020 | Radhakrishnan | ... G06F 11/3608 |
| 2021/0081819 A1* | 3/2021 | Polleri | .................. G06N 5/022 |
| 2023/0188480 A1* | 6/2023 | Menon | .................. G06N 5/041 |
| | | | 709/206 |

OTHER PUBLICATIONS

Zahra Ashktorab et al., Resilient Chatbots: Repair Strategy Preferences for Conversational Breakdowns, May 4-9, 2019, [Retrieved on Jul. 1, 2024]. Retrieved from the internet: <URL: https://dl.acm.org/doi/pdf/10.1145/3290605.3300484> 12 Pages (1-12) (Year: 2019).*
"What are the Different Types of Chatbots?" https://medium.com/finwintech/what-are-the-different-types-of-chatbots-c99cdd6b3248, Finwin Technologies, Oct. 13, 2020.
Lutkevich et al., "Definition: Bot," https://www.techtarget.com/whatis/definition/bot-robot ?, Mar. 9, 2022.

* cited by examiner

*Primary Examiner* — Anibal Rivera
(74) *Attorney, Agent, or Firm* — Weiss & Arons LLP (57) ABSTRACT

Bots are typically programmed to automate tasks and provide statistically expected results. However, a bot may malfunction and generate aberrant outputs. It is technically challenging to detect the aberrant outputs and determine whether the outputs are due to an error in how the bot processes inputs or because the bot has received unusual or unexpected input data. Apparatus and methods are provided for auto-determining why a bot has generated output outside expected results. An auto-correct bot will detect problems and auto-identify potential solutions, simulate those solutions and apply those solutions to remediate the malfunctioning bot.

13 Claims, 7 Drawing Sheets

SELF-CORRECTING BOT

FIELD OF TECHNOLOGY

This application describes apparatus and methods for utilizing artificial intelligence software tools to autonomously detect and cure malfunctions in automated bots.

BACKGROUND

Automated robots (or "bots" for short) are computer programs designed to interact with human users (hereinafter, "users") by mimicking mimic human-like behavior. Bots are typically used to automate repetitive tasks that would otherwise require a user to perform. Bots also allow users to receive service at any time, and bots may be specifically designed to accomplish specialized tasks.

For example, chatbots may be capable of answering common questions about goods or services. The chatbot receives input from a user. The inputs may be voice, text or a selection of choices presented by the chatbot. The inputs correspond to the user expressing a purpose or reason why the user needs customer service. Chatbots use a variety of techniques to correctly discern the meaning of the user's inputs and provide automated outputs that efficiently service the user.

Shopping bots or "shopbots" may be programmed to scour the internet and locate the best price for a product or service input by a user. Shopbots may also be programmed to receive a functionality description as user input and locate a product that provides the described functionality. Knowledge bots or "knowbots" collect knowledge for a user by automatically visiting websites to retrieve information that meets criteria associated with user input. Transactional bots are designed to execute financial tasks such as detecting suspicious account activity, blocking associated transactions or prompting a user for additional information to confirm authenticity of a transaction.

However, bots may not always be able to accurately discern the user's purpose or reason from the user's input. In such scenarios, the bot may be configured to connect the user to a human agent (hereinafter, "agent"). Additionally, sometimes the bot may assume that it understands the user's purpose or reason. However, the bot may in fact provide irrelevant or aberrant information to the user.

In such situations, it may not be clear why the bot is malfunctioning. Malfunctioning may include providing irrelevant information or connecting the user to an agent. The bot may not have understood a user's input, or the user may have provided an unusual input the bot was not programmed to process. However, it is technically challenging to determine why a bot may have malfunctioned. Furthermore, it is technically challenging to detect when a bot is providing irrelevant or aberrant outputs.

Accordingly, it would be desirable to provide systems and methods for detecting bot malfunctions. It would further be desirable to determine why the bot has malfunctioned and whether the bot has misinterpreted a user input, or the user has provided an unusual input. Finally, it would also be desirable to remediate a malfunctioning bot so that the bot is corrected to provide relevant outputs. Therefore, it would be desirable to provide apparatus and methods for SELF-CORRECTING BOTS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

An artificial intelligence ("AI") method is provided for autonomously diagnosing and remediating a bot malfunction. The methods may be performed by one or more computer systems. A computer system may be configured to perform particular operations or actions by virtue of having software, firmware, hardware, or a combination of them installed on the computer system that, in operation, causes the computer system to perform the particular operations or actions.

The method may include monitoring output generated by the bot. The output may be generated by the bot in response to receiving user input. The method may include detecting a threshold number of aberrant outputs. The threshold number of aberrant outputs may be detected during a first time-window.

The method may include identifying a potential solution for reducing the threshold number of aberrant outputs. The method may include simulating application of the potential solution. Based on results of the simulating, the method may include autonomously adjusting at least one processing parameter of the bot.

After implementing the autonomous adjusting, the method may include monitoring output generated by the bot and determining whether the monitored output includes the threshold number of aberrant outputs. The method may include monitoring the outputs generated by the bot during a second time window, after implementing the autonomous adjusting.

The method may include determining whether the aberrant outputs are due to the bot malfunctioning and erroneously processing user input or a user providing unusual inputs to the bot. The method may include parsing user inputs associated with each of the aberrant outputs generated by the bot. The method may include determining whether the threshold number of aberrant outputs is due to aberrant inputs or aberrant processing of inputs by the bot.

In response to determining that the threshold number of aberrant outputs is due to aberrant processing of the inputs by the bot, the method may include adjusting at least one processing parameter of the bot. Adjusting the processing parameter may recalibrate the bot. Recalibrating the bot may enable the bot to respond differently to future user input.

Recalibrating the bot may enable the bot to reduce the number of aberrant outputs generated in response to future user input.

For example, the methods may determine that aberrant outputs are associated with user inputs received from a target geographic location. The methods may further determine that one or more users in the target geographic location may speak with an accent or use a dialect that is causing the bot to misunderstand the received user inputs. The adjusting of the processing parameter may include applying a linguistic filter to adjust for the local dialect or local accent. The linguistic filter may be configured to convert user voice commands received from user in the target geographic region into a format that the bot is more likely to successfully process.

Methods may include adjusting the at least one processing parameter of the bot based on a timestamp associated with each of the inputs. For example, methods may determine that when user inputs are received during a target time-window, the bot is more likely to misinterpret those inputs and generate an aberrant output. Methods may include determining that at certain times of day, users are more likely to slur their voice commands or are multi-tasking and therefore less likely to issue organized, clear instructions to a bot.

Adjusting the at least one processing parameter of the bot may include programming the bot to confirm user instructions received during the target time-window. The bot may not confirm user instructions received outside the target time-window. During the target time-window, the bot may be configured to receive at least two inputs from a user before attempting to generate an output for the user. Such a recalibration of how the bot operates during the target time-window may reduce the chances the bot will generate an aberrant output.

Methods may include determining that the detected threshold number of aberrant outputs are due to aberrant processing of the inputs by the bot. Aberrant processing by the bot may be detected based on detecting a higher-than-usual number of glitches and computer crashes. Exemplary glitches may include a bot that sends messages to users without first receiving a user input or takes other action that is not correlated to a user input. An exemplary glitch may include a bot that operates slower than usual or generates irrelevant outputs that are not responsive to user inputs.

In response to determining that the threshold number of aberrant outputs are due to aberrant processing of the inputs by the bot, methods may include decommissioning the bot. The bot may be decommissioned for all user inputs at all times. The bot may be decommissioned specifically for user inputs received from a target geographic region or during a target time-window.

Methods may include generating simulated inputs. The methods may include generating known outputs for each of the generated simulated inputs. Methods may include submitting the simulated inputs to the bot. Methods may include determining whether outputs generated by the bot in response to the known inputs correspond to the known outputs.

Methods may include registering the bot as being associated with a processing error when output generated by the bot in response to a simulated input does not correspond to the corresponding known output. The divergence between the known outputs and outputs generated by the bot may indicate that the bot is malfunctioning and incorrectly processing user input.

Methods may include registering inputs received by the bot as being anomalous when the outputs generated by the bot in response to the simulated inputs correspond to the known outputs. When the known outputs are aligned with outputs generated by the bot, the bot is likely processing user inputs correctly. However, the bot may nonetheless be generating aberrant outputs because users are submitting anomalous inputs or inputs the bot is not configured to process. Methods may then include attempting to determine why or when users are submitting anomalous inputs. Methods may include decommissioning the bot in response to receipt of an anomalous input.

An artificial intelligence ("AI") system for autonomously diagnosing a bot malfunction is provided. The system may include one or more computer servers. A computer server may be a network connected system. A computer server, as disclosed herein, may include a processor circuit. The processor circuit may control overall operation of the server and its associated components. For example, the processor circuit may be a central processing unit ("CPU") or a graphic processing unit ("GPU"). The processor circuit may include hardware, such as one or more integrated circuits that form a chipset. The hardware may include digital or analog logic circuitry configured to perform any suitable (e.g., logical) operation.

For example, a computer server may include one or more of the following illustrative hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information and structural parameters of data; and machine-readable memory.

Machine-readable memory may be configured to store, in machine-readable data structures: algorithms for implementing machine learning and artificial intelligence or any other suitable information or data structures. Components of the computer server may be linked by a system bus, wirelessly or by other suitable interconnections. The components may be present on one or more circuit boards. In some embodiments, the components may be integrated into a single chip. The chip may be silicon-based.

The computer server may include RAM, ROM, an input/output ("I/O") module and a non-transitory or non-volatile memory. The I/O module may include a microphone, button and/or touch screen which may accept user-provided input. The I/O module may include one or more speakers for providing audio output and a video display for providing textual, audiovisual and/or graphical output.

A computer server may include various other components, such as a display, battery, speaker, and antennas. For example, the computer server may include a communication circuit. The communication circuit may include a network interface card or adapter. When used in a WAN networking environment, the computer server may include a modem, antenna or other circuitry for establishing communications over a WAN, such as the Internet. The existence of any of various well-known protocols such as TCP/IP, Ethernet, FTP, HTTP and the like is presumed, and the computer server may operate in a client-server configuration to permit retrieval of web pages from a web-based server. Web browsers can be used to display and manipulate data on web pages.

A computer server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing"). Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A computer server may utilize computer-executable instructions, such as program modules, executed by the processor circuit. Generally, program modules include routines, programs, objects, components, data structures, etc. that are collectively included in a software application that when executed by the processor circuit, instructs the computer server to perform particular tasks or functions.

Software applications may be stored within the non-transitory memory and/or other storage medium. The computer server may include cloud computing and virtualization implementations of software. Such implementations may be designed to run on a physical computer server supplied externally by a hosting provider, a client, or other virtualized platform.

Software applications may provide instructions to the processor circuit that enable the computer server to perform various functions. For example, the non-transitory memory may store software applications such as an operating system, application programs, and a database. Some or all of the computer executable instructions of software applications may be embodied in hardware or firmware components of the computer server.

Software applications may include computer executable instructions for invoking user functionality related to communication, such as email, short message service ("SMS"), and voice input and speech recognition applications. Software applications may utilize one or more algorithms that formulate simulated inputs and corresponding outputs, process user inputs, detect aberrant outputs, adjust a bot processing parameter or any other suitable tasks.

Software applications may include machine learning algorithms that identify patterns in user inputs provided to a bot and outputs generated by the bot in response to the user inputs. Machine learning algorithms may make decisions about how to change a processing parameter of the bot based on the detected patterns. Machine learning algorithms may improve over time because these algorithms are programmed to learn from previous decisions. Illustrative machine learning algorithms may include AdaBoost, Naive Bayes, Support Vector Machine and Random Forests.

An illustrative machine learning algorithm may include a neural network such as Artificial Neural Networks and Convolutional Neural Networks. Generally, a neural network implements machine learning by passing an input through a network of neurons—called layers—and providing an output. The more layers of neurons that are included in the neural network, the "deeper" the neural network. A neural network is programmed to learn from outputs flagged as erroneous and adapt its neuron connections such that the next time the neural network receives a particular input it generates a more relevant output.

To effectively provide relevant outputs, a neural network is typically trained by analyzing training data. Neural networks learn from the training data and rearrange interconnection between layers of the network in response to processing (e.g., detecting patterns or relationships between data elements) the training data. The strength or weight of a connection between layers of the neural network can vary. A connection between two or more layers can be strong, weak or anywhere in between. A neural network may self-adapt by adjusting the strength of the connections among its layers to generate more accurate and relevant outputs.

The computer server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

A computer server disclosed herein may be produced by different manufacturers. For example, a user may connect to a computer server hosting an automated chatbot system via a first computer server, and the chatbot that processes the user's inputs may be run on a second computer server. An agent may utilize a third computer server to submit inputs while interacting with the user and/or the chatbot.

A computer server may capture data in different formats. The computer server may use different data structures to store captured data. The computer server may utilize different communication protocols to transmit captured data or communicate with other systems. Despite such operational differences, computer servers may be configured to operate substantially seamlessly to interact with the user, agent and the chatbot across different servers, operating systems, hardware or networks.

The AI system may include an automated bot. The bot may include machine executable instructions stored on a non-transitory memory of a computer server. The machine executable instructions when executed by a processor on the computer server may implement functionality of the bot. The machine executable instructions may include one or more software applications.

Illustrative bot functionality implemented by the machine executable instructions may include receiving inputs from a user. The user inputs may include voice inputs. The user input may include text or touch input. The bot may provide an interface for a user to interact with functionality provided by the bot. The bot may utilize one or more machine learning algorithms to generate an automated output based on the input received from the user.

The AI system may include a first bot and a second bot. The second bot may be programmed to monitor the user inputs and automated output generated by the first bot. The second bot may be a supervisory bot that oversees the activity of the first bot. In some embodiments, the first bot may also be a supervisory bot. For example, the first bot may be programmed to oversee the activity of the second bot.

The second bot may be programmed to monitor the activity of the first bot during a first time-window. The second bot may be programmed to detect a threshold number of aberrant automated outputs generated by the first bot. The second bot may determine a malfunction that is causing the first bot to generate the threshold number of aberrant automated outputs. The second bot may reprogram the first bot to change a processing parameter applied by the first bot to reduce the number of aberrant outputs generated by the first bot.

The second bot may be programmed to compute a change to the processing parameter based on applying a machine learning algorithm to automated outputs generated by the first bot before and during a first time-window. The machine learning algorithm may attempt to discern which user inputs are triggering aberrant outputs and which processing parameters are activated by the bot in response to those user inputs.

The second bot may identify the processing parameter by generating simulated inputs and providing those simulated inputs to a plurality of bots. The second bot may determine a change to the processing parameter based on applying a machine learning algorithm to automated outputs generated by a plurality of bots in response to simulated inputs. The machine learning algorithm may look for patterns in the automated outputs and determine which processing parameters are likely causing the bot to generate aberrant outputs. Simulated inputs may be configured to test how a bot processes target inputs.

The second bot may be programmed to simulate the change to the processing parameter of the first bot. The second bot may simulate the change before reprogramming the first bot. The second bot may simulate change by generating test inputs. The second bot may then input the test inputs into the first bot. The second bot may monitor automated outputs generated by the first bot in response to the test inputs.

The second bot may apply one or more machine learning algorithms to detect aberrant outputs generated by the first bot. The machine learning algorithms may implement machine learning AI and deep learning AI. Machine learning AI may identify patterns in data sets (e.g., inputs or outputs) and make decisions based on the detected patterns. Machine learning AI improves each time the AI system receives a new data set because new patterns may be discovered in the larger data set now available to the machine learning AI. Deep learning AI adapts when exposed to different patterns within a data set. Deep learning AI may uncover features or patterns in the data set that the deep learning AI was never specifically programmed to find.

The second bot may be programmed to detect the threshold number of aberrant outputs generated by the first bot based on a length of an interaction of the first bot with a user that submits at least one of the user inputs. For example, the second bot may detect that when a user provides certain inputs, the user interaction with the first bot is unusually long or unusually short. The second bot may then scrutinize the outputs generated by the first bot in response to those inputs and determine whether the outputs were relevant to the user or germane to the received user inputs.

The second bot may detect aberrant outputs based on linguistic patterns (e.g., words or prosody) extracted from the at least one input provided by a user to the first bot. The second bot may utilize one or more machine learning algorithms to detect user inputs that include atypical linguistic patterns. The second bot may then scrutinize the outputs generated in response to those user inputs that included the atypical linguistic patterns and determine whether the generated outputs were relevant to the user or germane to the received user inputs.

The second bot may detect aberrant outputs based on a total number of user interactions serviced by the first bot during a target time-window. A change in the number of interactions may be referred to as a recurrence rate or how often users are accessing a bot.

For example, the second bot may detect whether the first bot is servicing a consistent number of user interactions during a target time window. The second bot may compare the number of serviced user interactions to the number of user interactions serviced in a time-window before or after the target time-window. If the second bot detects an increase or decrease in the number of user interactions serviced by the first bot, the second bot may then scrutinize the outputs generated by the first bot during those user interactions and determine whether the outputs generated by the first bot were relevant to the user or germane to the received user inputs.

An increase or decrease in the number of bot interactions during a given time window may indicate that the first bot is providing aberrant outputs. For example, an increase may indicate that users are not getting the information they need from the first bot and are repeatedly attempting to obtain that information. A decrease may also indicate that users are not obtaining the information they need from the first bot and are utilizing alternative channels (e.g., non-bot channels) to obtain that information.

The second bot may be programmed to simulate the change to the processing parameter of the first bot by generating a test input. The second bot may submit the test input to a digital twin of the first bot. A digital twin may refer to a virtual representation of the first bot. The digital twin may be a virtual, software-based representation that serves as the real-time digital counterpart of the first bot. The digital twin may simulate, validate, and/or understand different software applications running on the first bot and their dependencies when running different components such as processor circuits, machine-readable memory, cloud services, load balancers, web servers, database servers, network servers, etc.

The second bot may trace each operational step performed by the digital twin to generate an automated output in response to a test or simulated input. Based on the tracing, the second bot may determine why the first bot is malfunctioning. For example, the tracing may detect where, when and why the first bot is processing user inputs incorrectly.

The second bot may be programmed to monitor the user inputs received by the first bot and automated outputs generated by the first bot during a second time-window. The second time-window may begin after the first bot is reprogrammed to change the processing parameter. The second bot may determine whether, after changing the processing parameter, the first bot generates less than the threshold number of aberrant outputs.

An artificial intelligence ("AI") system for autonomously diagnosing and remediating a bot malfunction is provided. The system may include a plurality of bots. Each of the bots in the plurality may be programmed to receive user inputs and generate automated outputs responsive to the user inputs. The system may include a supervisory bot. During a first time-window, the supervisory bot may be programmed to monitor automated outputs generated by the plurality of bots in response to the user inputs. The supervisory bot may detect a target bot in the plurality that is generating a threshold number of aberrant automated outputs.

During a second-time window, the supervisory bot may capture a user input destined for the target bot. The supervisory bot may provide the user input destined for the target bot to a secondary bot. The supervisory bot may trace a processing, by the secondary bot, of the user input destined for the target bot. The secondary bot may be a digital twin of the target bot. The digital twin may be generated prior to the start of the first time-window.

In response to detecting a divergence in the processing of the user input by the target bot and the secondary bot, the supervisory bot may generate a plurality of test inputs. The supervisory bot may submit the plurality of test inputs to the target bot and the secondary bot. Based on automated outputs generated by the target bot and the secondary bot in response to the plurality of test inputs, the supervisory bot may formulate a remedial action for reducing the number of aberrant outputs generated by the target bot.

The secondary bot may include one or more software applications that simulate interaction of software and hardware components of the target bot. The software applications of the secondary bot may generate data records based on the simulated interaction of the software/hardware components of the target bot. The data records generated by the secondary bot may show progressive steps executed by the software/hardware components of the target bot to generate an output responsive to user inputs.

The supervisory bot may apply the remedial action to the target bot to reduce the threshold number of aberrant automated outputs generated by the target bot. The remedial action may include autonomously reprogramming the target bot to change a processing parameter applied by the target bot. The remedial action may include adding a pre-processing module to the target bot. The pre-processing module may be configured to filter future user inputs received by the target bot after the second time-window and before the target bot generates automated outputs based on the future user inputs.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
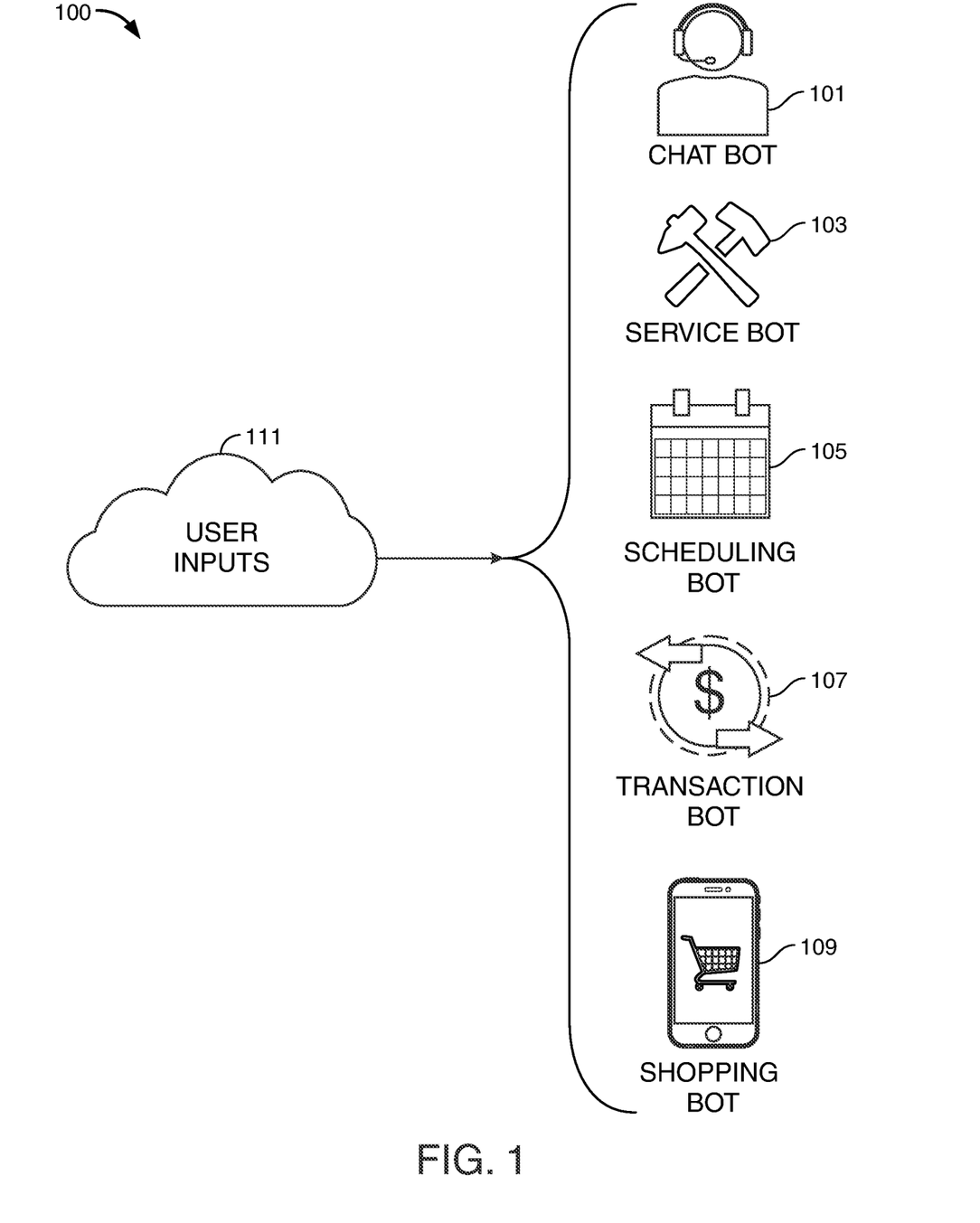
FIG. 1 shows illustrative bots in accordance with principles of the disclosure.

FIG. 1 shows illustrative bot ecosystem 100. Ecosystem 100 includes chatbot 101. Chatbot 101 may receive user inputs 111 and be capable of answering common questions and providing transactional support in response to user inputs 111. Ecosystem 100 includes service bot 103. Service bot 103 may provide automated access to a service provided by a vendor. Illustrative services may include completing a loan or credit card application. User inputs 111 may include documents or other information and service bot 103 may be configured to complete the loan or credit card application based on user inputs 111.

Ecosystem 100 includes scheduling bot 105. Based on user inputs 111, scheduling bot 105 may autonomously schedule tasks or meetings. For scheduling bot 105, user inputs 111 may include email correspondence or calendar entries. Ecosystem 100 includes transaction bot 107. Transaction bot 107 may autonomously execute financial tasks such as detecting suspicious account activity and blocking associated transactions. For transaction bot 107, user inputs 111 may include purchases, deposits, bill payments, withdrawals or other financial account activity.

Ecosystem 100 includes shopping bot 109. Shopping bot 109 may autonomously locate a desired product or service for a user. For shopping bot 109, user inputs 111 may include a product or service. Shopping bot 109 may autonomously a best available price for the desired product or service.

Figure 2:
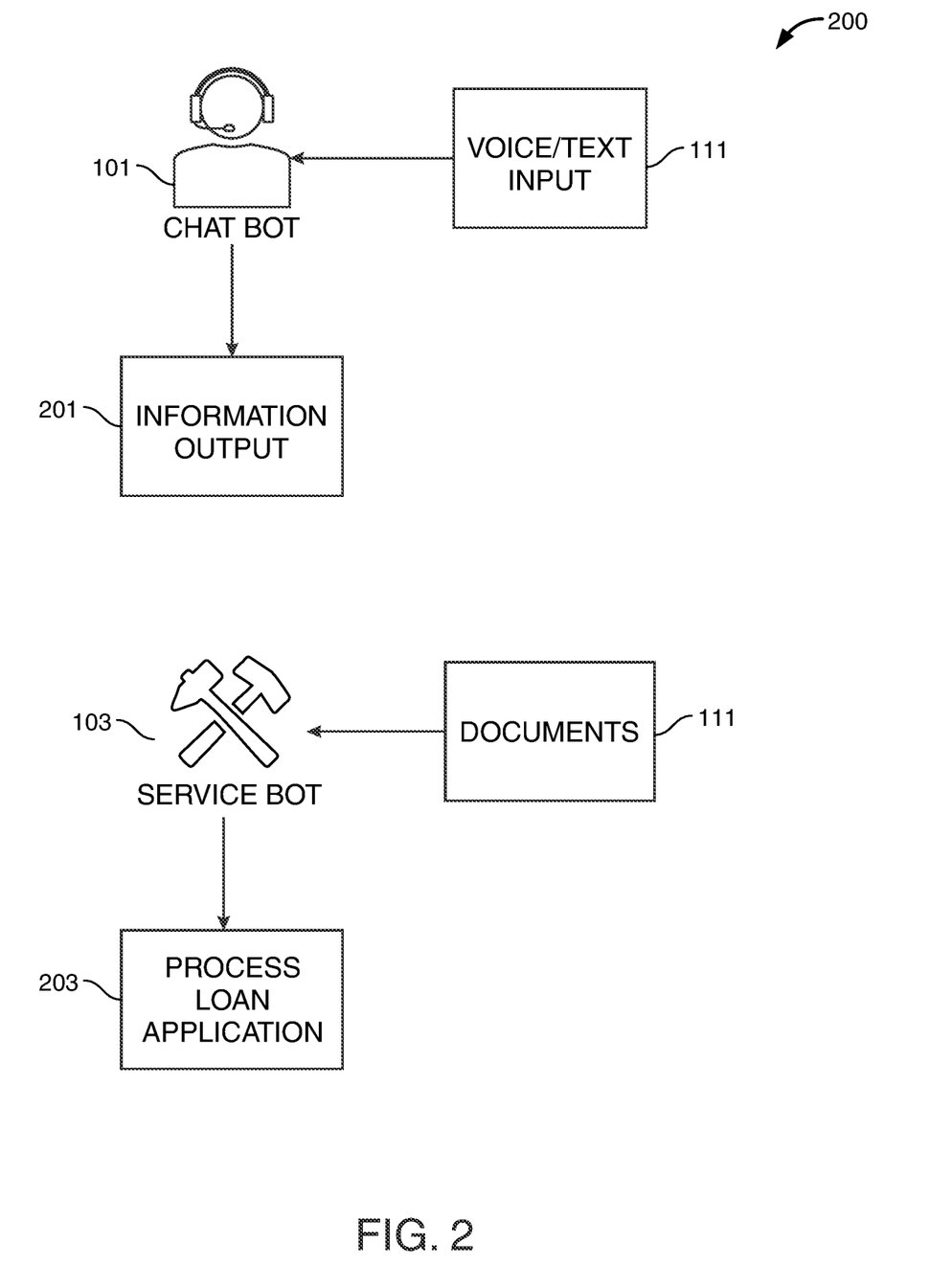
FIG. 2 shows illustrative input/outputs for illustrative bots shown in FIG. 1.

FIG. 2 shows illustrative inputs/outputs 200 that may be received by the bots of ecosystem 100. FIG. 2 shows that chatbot 101 may receive user inputs 111. Chatbot 101 may process the received user inputs 111 and provide responsive output. User inputs 111 received by chatbot 101 may include audio, text or a selection of choices presented by the chatbot. User inputs 111 may correspond to a user expressing a purpose or reason why the user needs customer service or transaction support. Output provided by chatbot 101 may include answering common questions and providing transactional support.

Chatbot 101 may use a variety of techniques to correctly discern the meaning of user inputs 111 and provide responsive output 201. Chatbot 101 may utilize artificial intelligence and machine learning algorithms such as natural language processing to understand user inputs 111. Chatbot 101 may also utilize machine learning algorithms to learn from past experiences and contexts when processing user inputs 111.

Inputs/outputs 200 show that service bot 103 may receive user inputs 111 that include documents and information needed to process loan application 203. Service bot 103 may parse the provided documents and information to confirm they meet the requirements of a loan application. In response to user input 111, service bot 103 may inform a user that additional information or documents are needed. Output 203 provided by service bot 103 includes collating and processing a loan application. Service bot 103 may also provide automated access to any suitable service provided by a vendor.

Figure 3:
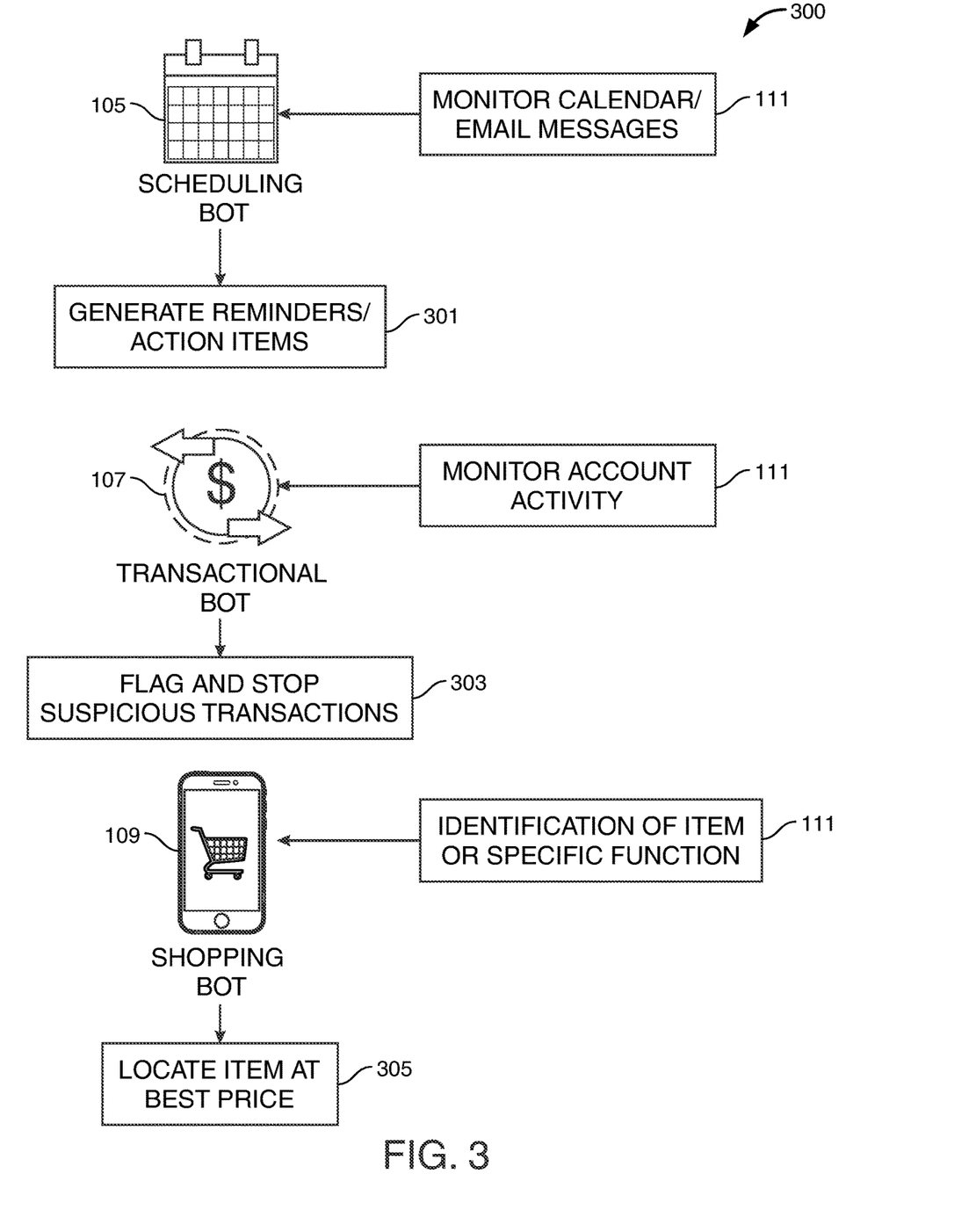
FIG. 3 shows illustrative input/outputs for illustrative bots shown in FIG. 1.

FIG. 3 shows illustrative inputs/outputs 300 that may be received by bots included in ecosystem 100. FIG. 3 shows that scheduling bot 105 may integrate with a user's email application and user inputs 111 may include a user's inbox and received/sent message activity. Scheduling bot 105 may adjust autonomous scheduling of tasks based on calendared events, content, inflow or outflow of the user's email messages. Based user inputs 111, scheduling bot 105 may generate output 301 which identifies meetings or deadlines. Output 301 may include adding reminders to a user's calendar to attend the meetings or complete tasks by the deadline.

FIG. 3 shows that transaction bot 107 may execute financial tasks such as detecting suspicious account activity and blocking associated transactions. User inputs 111 provided to transaction bot 107 may include account and bill pay activity. Based on user inputs 111, transaction bot 107 may generate output 303. Output 303 may include preemptive actions that mitigate exposure to suspicious transactions, such as freezing a suspicious transaction until receiving confirmation from a user that the transaction flagged as suspicious has been authorized by the user. Based on user inputs 111, transaction bot 107 may suggest payment instruments or other financial tools that may benefit a user.

FIG. 3 shows that shopping bot 109 may receive user inputs 111 that include a product, service or even a description of a desired functionality. Shopping bot 109 may provide output 305 that includes locating the desired product or service a price for the input product or service. Shopping bot 109 may process the user's description of a desired functionality. Shopping bot 109 may utilize natural language processing or other forms of AI to locate a product or service that provides the user described functionality.

Figure 4:
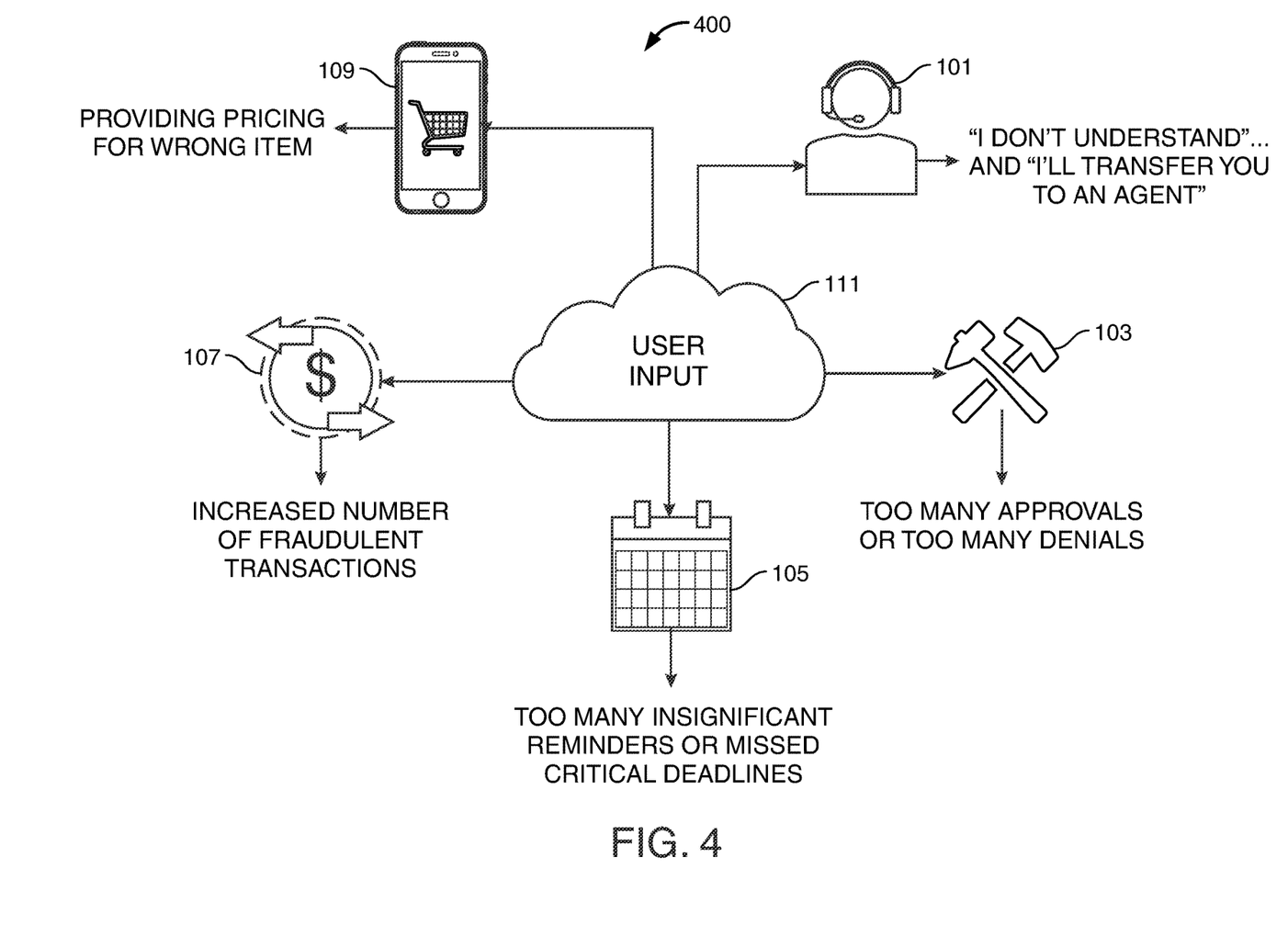
FIG. 4 shows illustrative bot malfunctions for illustrative bots shown in FIG. 1.

FIG. 4 shows illustrative malfunctions 400 that may be associated with chatbots included in ecosystem 100. FIG. 4 shows that chatbot 101 may not understand user inputs 111. For example, chatbot 101 may not understand a purpose or reason why the user needs customer service. Chabot 101 may therefore be unable to provide output responsive to user inputs 111. FIG. 4 shows that service bot 103 may generate too many approvals or too many denials of submitted loan applications. The excessive number of approval or denials may indicate that service bot 103 is not processing loan applications as expected.

FIG. 4 shows that scheduling bot 105 may generate too many reminders that alert a user to insignificant events. FIG. 4 also shows that scheduling bot 105 may miss scheduling reminders for critical events. Either of these scenarios may indicate that scheduling bot 105 is not processing user inputs 111 as expected.

FIG. 4 shows that transaction bot 107 may generate an excessive number of alerts or miss extremely suspicious transactions. Either of these scenarios may indicate that transaction bot 107 is not processing user inputs 111 as expected.

FIG. 4 also shows that shopping bot 109 may not locate relevant items or may provide erroneous pricing information in response to user inputs 111. Either of these scenarios may indicate that shopping bot 109 is not processing user inputs 111 as expected.

Figure 5:
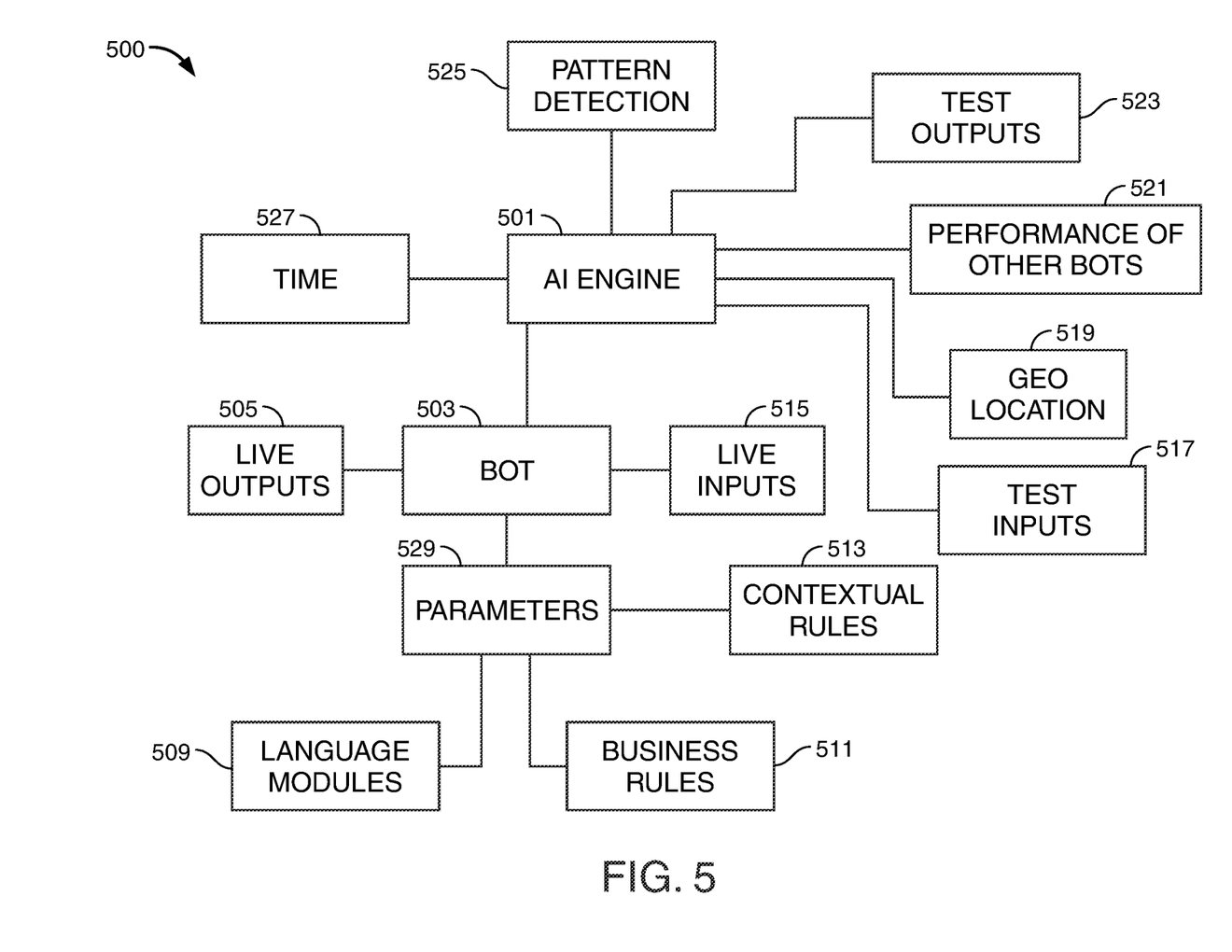
FIG. 5 shows an illustrative system for detecting and remediating bot malfunctions in accordance with principles of the disclosure.

FIG. 5 shows illustrative system 500 for autonomously diagnosing and remediating a malfunctioning bot. System 500 includes bot 503. Bot 503 may be any suitable bot, including one or more of the bots shown in connection with ecosystem 100. Bot 503 may receive inputs 515 and generate outputs 505. Bot 503 may generate outputs 505 based on processing parameters 529.

Processing parameters 529 include contextual rules 513. Contextual rules 513 allow bot 503 to "remember" earlier user inputs and improve output 505 as additional inputs 515 are received. Contextual rules 513 may be adjusted such as by changing how long bot 503 will "remember" a prior input 515 or whether bot 500 will share its memory across different users.

Processing parameters 529 include language modules 509. Language modules 509 may allow bot 503 to apply filters or otherwise account for vocabulary, dialect, or other prosody characteristics associated with inputs 515. Language modules 509 may be adjusted such as by applying/removing filters or adding language specific vocabulary.

Processing parameters 529 include business rules 511. Business rules 511 may define prompts for inputs 515 needed for a specific application, service or product. Business rules 511 may define how bot 503 processes inputs 515 for a given application or service. Business rules 511 may be adjusted such as by allowing/rejecting target documents included in inputs 515 or changing the eligibility requirements for a product or service.

System 500 includes AI engine 501. AI engine 501 may be designed to service a specific bot that provides a specific function. AI engine 501 may be designed to service multiple bots, each bot having a different function. AI engine 501 may be a computer server. AI engine 501 may include software applications that process datasets to enable problem-solving by other software applications. AI engine 501 may perform problem-solving tasks that normally require human-like intelligence. Illustrative software applications utilized by AI engine 501 may include AdaBoost, Naive Bayes, Support Vector Machine, Random Forests, Artificial Neural Networks and Convolutional Neural Networks. AI engine 501 may perform machine learning AI and deep learning AI.

AI engine 501 may be configured to detect a malfunction of bot 503. AI engine 501 may be configured to autonomously diagnose and remediate the detected malfunction. AI engine 501 may monitor inputs 515 received by bot 503 and output 505 generated by bot 503. AI engine 501 may detect a malfunction based on whether bot 503 generates outputs 505 that include a threshold number of aberrant outputs.

AI engine 501 may detect aberrant outputs based on a total number of user interactions serviced by bot 503 during a target time-window. For example, AI engine 501 may detect whether bot 503 is generating a consistent number of outputs 505 for a given number of inputs 515. AI engine 501 may examine outputs 505 to determine whether outputs 505 generated by bot 503 were relevant or germane to user inputs 515. Outputs 505 that are irrelevant or non-germane to user inputs 515 may be classified by AI engine 501 as aberrant outputs. AI engine 501 may detect an increase or decrease in the number of outputs 505 that are aberrant, proportionally, relative to the number of received inputs 515.

AI engine 501 may also apply machine learning algorithms to detect patterns 525 in outputs 505. AI engine 501 may detect atypical patterns that may indicate bot 503 is generating aberrant outputs. AI engine 501 may compare outputs 505 generated by bot 503 to outputs generated by other bots 521. Other bots 521 may include one or more of bots 101-109 shown in connection with ecosystem 100 (in FIG. 1). Other bots 521 may be programmed to provide functionality identical or similar to bot 503. For example, if bot 503 is a chatbot, AI engine 501 may monitor outputs of other chatbots. AI engine 501 may identify aberrant outputs when bot 503 generates outputs 505 that do not fit within a statistical pattern defined by the outputs generated by the other chatbots.

AI engine 501 may periodically test bot 503 using test inputs 517. Test inputs 517 may be associated with known test outputs 523. AI engine 501 may submit test inputs 517 to bot 503 and determine whether bot 503 generates known test outputs 523.

In response to detecting that bot 503 is generating aberrant outputs, AI engine 501 may attempt to remediate bot 503. For example, AI engine 501 may utilize one or more machine learning algorithms to detect whether inputs 515 include atypical linguistic patterns. AI engine 501 may determine whether aberrant outputs are specifically associated with inputs 515 received from geographic location 519. AI engine 501 may determine whether aberrant outputs are associated with inputs 515 received at time 527. Time 527 may include a target time-window.

To remediate bot 503 and reduce a number of aberrant outputs, AI engine 501 may autonomously adjust one or more processing parameters 529 of bot 503. Autonomously adjusting processing parameters 529 may include activating a linguistic filter within language module 509. The linguistic filter may normalize voice user inputs received from geographic location 519 and account for a local dialect or local accent. The linguistic filter may be configured to convert inputs 515 received from geographic location 519 into a format that bot 503 is more likely to successfully process.

Adjusting processing parameters 529 may include changing contextual rules 513 or business rules 511. For example, AI engine 501 may change business rules 511 so that bot 503 is programmed to confirm user instructions received during a target time-window. Bot 503 may be programmed to require at least two inputs from a user before attempting to generate an output for the user. Such a recalibration may reduce the chances bot 503 will generate an aberrant output.

Figure 6:
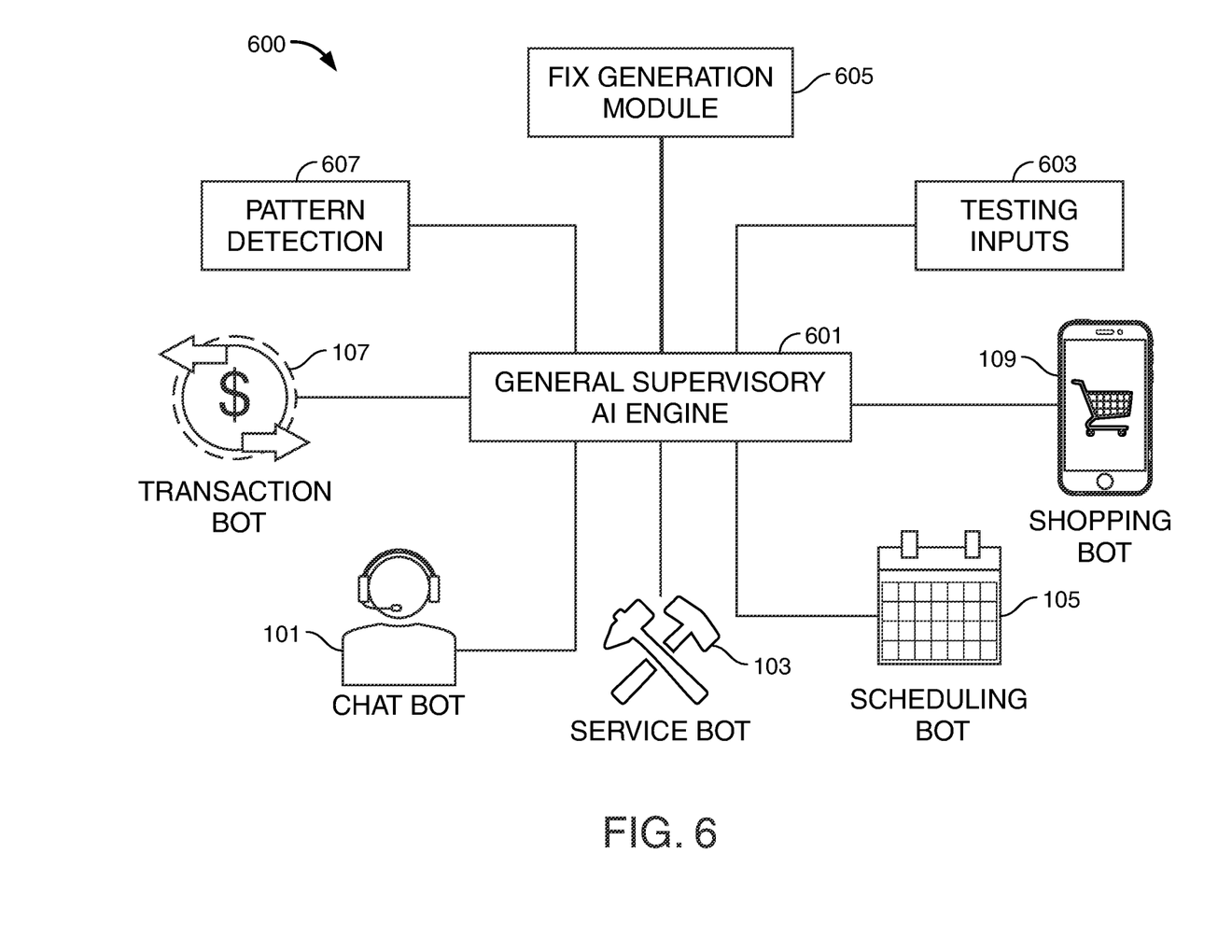
FIG. 6 shows an illustrative system for detecting and remediating bot malfunctions in accordance with principles of the disclosure.

FIG. 6 shows illustrative system 600. System 600 shows that supervisory AI engine 601 may be configured to autonomously diagnose and remediate malfunctions associated with multiple bots (e.g., bots 101-109 shown in connection with ecosystem 100). AI engine 601 may detect bot malfunctions based on performing cross-bot pattern detection 607. Cross-bot pattern detection 607 may identify baseline bot performance characteristics. AI engine 601 may then detect when a bot deviates from the baseline performance characteristics. Deviation from the baseline performance characteristics may indicate that a bot is malfunctioning and generating aberrant outputs.

In response to detecting a bot malfunction, AI engine 601 may activate fix generation module 605 to remediate the malfunction. Fix generation module 605 may submit testing inputs 603 to a malfunctioning bot. AI engine 601 may attempt to diagnose why the bot is malfunctioning based on outputs generated in response to the testing inputs 603. Fix generation module 605 may apply machine learning or other artificial intelligence algorithms to identify parameter configurations that, if changed, may reduce the number of aberrant outputs generated by a bot.

Figure 7:
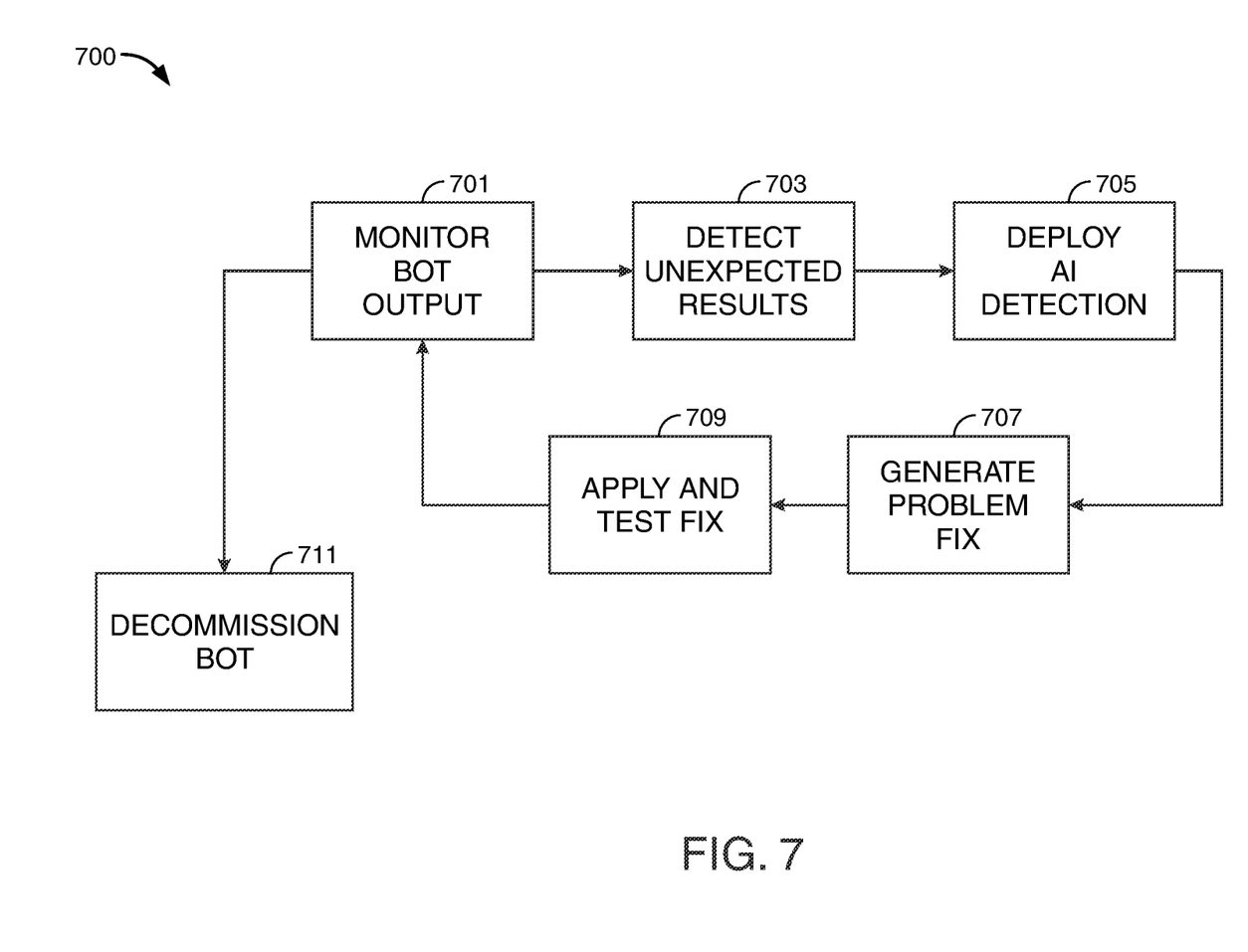
FIG. 7 shows an illustrative process for detecting and remediating bot malfunctions in accordance with principles of the disclosure.

FIG. 7 shows illustrative process 700. Process 700 may be performed by an AI engine, such as AI engine 501 (shown in FIG. 5) or AI engine 601 (shown in FIG. 6). Process 700 begins at step 701 with the AI engine monitoring output of a bot. At step 703, the AI engine detects that the bot is generating unexpected or aberrant outputs.

At step 705, AI engine utilizes AI and machine learning algorithms to determine why the bot is generating the aberrant outputs. For example, the AI engine may attempt to determine whether bot is generating aberrant outputs due erroneously processing user input or a user providing unusual inputs to the bot. At step 707, the AI engine generates a fix to the detected malfunction. The fix may include recalibrating the malfunctioning bot.

At step 709, the AI engine applies the fix to the malfunctioning bot. Applying the fix may include adjusting at least one processing parameter of the bot. Adjusting the processing parameter may enable the bot to respond differently to user inputs or process user inputs differently, such as by assigning different weights to different words or applying different natural language processing algorithms. Applying the fix may enable the bot to reduce the number of aberrant outputs generated in response to user input.

Step 711 shows that in some scenarios, the AI engine may decommission the bot in response to detecting a malfunction. AI engine may determine that a fix is not available to remediate the malfunctioning bot. AI engine may determine that even after applying the fix, the bot is still generating more than a threshold number of aberrant outputs.

Thus, methods and apparatus for a SELF-CORRECTING BOT are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") system for autonomously diagnosing and remediating a malfunction of a bot, the system comprising:
   one or more computer servers including a processor circuit;
   a plurality of bots that are each programmed to receive user inputs and generate automated outputs to the user inputs; and
   a supervisory bot that is programmed to:
      during a first time-window:
         monitor automated outputs generated by the plurality of bots in response to the user inputs; and
         detect a target bot in the plurality of bots that is generating a threshold number of aberrant automated outputs; and
      during a second time-window:
         intercept a user input destined for the target bot;
         input the user input destined for the target bot to a secondary bot;
         trace a processing by the secondary bot of the user input destined for the target bot;
         in response to detecting a divergence in the processing of the user input by the target bot and the secondary bot, generate a plurality of test inputs;
         submit the plurality of test inputs to the target bot and the secondary bot;
         based on automated outputs generated by the target bot and the secondary bot in response to the plurality of test inputs, formulate a remedial action; and
         apply the remedial action to the target bot to reduce the threshold number of aberrant automated outputs generated by the target bot.

2. The AI system of claim 1, wherein the remedial action comprises reprogramming the target bot to change a processing parameter applied by the target bot.

3. The AI system of claim 1, wherein the remedial action comprises adding a pre-processing module to the target bot that is configured to filter any future user inputs received by the target bot after the second time-window and before the target bot generates automated outputs based on the future user inputs.

4. The AI system of claim 1, wherein:
   the secondary bot is a digital twin of the target bot; and
   the digital twin is generated prior to a start of the first time-window.

5. An artificial intelligence ("AI") method for autonomously diagnosing a malfunction of a bot, the method comprising extracting computer readable instructions stored on a non-transitory medium and executing the computer readable instructions on a processor, wherein execution of the computer readable instructions by the processor:
   monitors outputs generated by the bot;
   detects a threshold number of aberrant outputs during a time-window;
   identifies a potential solution for reducing the threshold number of aberrant outputs;
   simulates application of the potential solution;
   based on results of the simulating, autonomously adjusts at least one processing parameter of the bot;
   parses inputs associated with each of the aberrant outputs;
   determines whether the threshold number of aberrant outputs are due to aberrant inputs or aberrant processing of the inputs by the bot; and
   in response to determining that the threshold number of aberrant outputs are due to aberrant processing of the inputs by the bot, adjusts the at least one processing parameter of the bot based on a geographic location associated with inputs received by the bot after the time-window.

6. The AI method of claim 5, wherein execution of the computer readable instructions by the processor, during a second time window, monitors all output generated by the bot and determines whether all the output includes the threshold number of aberrant outputs.

7. The AI method of claim 5, wherein execution of the computer readable instructions by the processor adjusts the at least one processing parameter of the bot by applying a linguistic filter to adjust for a local dialect or local accent associated with the geographic location.

8. The AI method of claim 5, wherein execution of the computer readable instructions by the processor:
generates simulated inputs;
generates known outputs associated with the simulated inputs;
submits the simulated inputs to the bot;
determines whether outputs generated by the bot in response to the simulated inputs correspond to the known outputs;
registers the bot as being associated with a processing error when the outputs generated by the bot in response to the simulated inputs do not correspond to the known outputs; and
registers the inputs as being erroneous when the outputs generated by the bot in response to the simulated inputs correspond to the known outputs.

9. An artificial intelligence ("AI") system for autonomously diagnosing a malfunction with a bot, the system comprising:
one or more computer servers including a processor circuit;
a first bot that is programmed to receive user inputs and generate automated outputs to the user inputs;
a second bot that is programmed to:
monitor the user inputs and automated outputs generated by the first bot during a first time-window;
detect a threshold number of aberrant automated outputs generated by the first bot;
diagnose a malfunction that is causing the first bot to generate the threshold number of aberrant automated outputs; and
autonomously reprogram the first bot to change a processing parameter applied by the first bot;
wherein:
the second bot is further programmed to simulate the change to the processing parameter before autonomously reprogramming the first bot; and
the second bot is programmed to simulate the change to the processing parameter by:
generating test inputs;
inputting the test inputs to the first bot; and
monitoring automated outputs generated by the first bot in response to the test inputs.

10. The AI system of claim 9, wherein:
the second bot is further programmed to monitor the user inputs and automated outputs generated by the first bot during a second time-window; and
the second time-window begins after the first bot is reprogrammed to change the processing parameter.

11. The AI system of claim 9, wherein the second bot is programmed to determine the processing parameter based on applying a machine learning analysis to automated outputs generated by a plurality of bots.

12. The AI system of claim 9, wherein the second bot is programmed to determine the processing parameter based on applying a machine learning analysis to automated outputs generated by the first bot before and during the first time window.

13. The AI system of claim 9, wherein the second bot is programmed to detect the threshold number of aberrant automated outputs generated by the first bot based on:
a length of an interaction of the first bot with a user that submits at least one of the user inputs;
linguistic patterns extracted from the at least one of the user inputs;
a total number of interactions serviced by the first bot during the first time-window; and
a recurrence rate associated with the total number of interactions.

* * * * *